US 6,614,603 B2

(12) United States Patent
Himmele

(10) Patent No.: US 6,614,603 B2
(45) Date of Patent: Sep. 2, 2003

(54) SPORTS BINOCULAR VISOR ASSEMBLY AND METHOD

(76) Inventor: Tristam W. Himmele, 614 1st Ave. S., Lake Worth, FL (US) 33460

(*) Notice: Subject to any disclaimer, the term of this patent is extended or adjusted under 35 U.S.C. 154(b) by 0 days.

(21) Appl. No.: 10/117,989

(22) Filed: Apr. 6, 2002

(65) Prior Publication Data

US 2002/0145814 A1 Oct. 10, 2002

Related U.S. Application Data

(63) Continuation-in-part of application No. 09/523,213, filed on Mar. 10, 2000, now Pat. No. 6,369,958.
(51) Int. Cl.⁷ .......................... G02B 7/02; G02B 23/00; G09G 5/00; A42B 1/24
(52) U.S. Cl. .......................... 359/815; 359/409; 345/8; 2/209.13; 351/123
(58) Field of Search ................. 359/815, 407, 359/409, 630; 2/7, 10, 209.12, 209.13, 171.3; 345/7, 8, 9; 351/123, 158

(56) References Cited

U.S. PATENT DOCUMENTS

| 4,077,703 A | 3/1978 | Pablo ........................ 359/480 |
| 5,023,706 A | 6/1991 | Sandberg .................... 358/254 |
| 5,179,735 A | 1/1993 | Thomanek ......................... 2/6 |
| 5,608,808 A | 3/1997 | Da Silva .................... 381/183 |
| 5,715,323 A * | 2/1998 | Walker ....................... 351/123 |
| 5,767,820 A | 6/1998 | Bassett et al. ................. 345/8 |
| 5,786,932 A | 7/1998 | Pniel ......................... 359/409 |
| 6,046,712 A | 4/2000 | Beller et al. .................. 345/8 |
| 6,115,846 A | 9/2000 | Truesdale ................. 2/209.13 |
| 6,160,666 A | 12/2000 | Rallison et al. ............ 359/630 |
| 6,305,026 B1 * | 10/2001 | Mo .......................... 2/209.13 |

* cited by examiner

Primary Examiner—Loha Ben
(74) Attorney, Agent, or Firm—Clifford Kraft

(57) ABSTRACT

A hands-free binocular visor headgear for viewing sporting and other events where it is desirable to use binoculars but also have the free use of the hands. An adjustable head securing device secures the unit to the user's head. Binoculars or other optics are attached to the head securing device such that they can be pivoted between an in-use and a not in-use position. The unit can also optionally contain removable earmuffs, a removable or fixed AM/FM radio or scanner or combination AM/FM/Scanner, at least one removable earphone and a removable microphone. The user can pick and choose what exact equipment he needs for a particular sporting event.

22 Claims, 4 Drawing Sheets

SPORTS BINOCULAR VISOR ASSEMBLY AND METHOD

This application is a continuation in part of co-pending application Ser. No. 09/523,213 filed Mar. 10, 2000 now U.S. Pat. No. 6,369,918 This application incorporates application Ser. No. 09/523,213 by reference.

BACKGROUND

1. Technical Field

The present invention relates to sporting event accessories and more particularly to a sports viewing assembly that can include binoculars and other equipment mounted on a piece of headgear.

2. Background Art

It is often desirable to use binoculars for better viewing the action while attending sporting events and the like. Although binoculars provide a useful mechanism for enhancing the viewing of the event, they are often bothersome because the user must continuously dedicate at least one hand to supporting the binoculars. It would be a benefit therefore, to have a binocular assembly that included a hands free support mechanism for supporting the binoculars in front of the user's eyes without using either of the user's hands.

SUMMARY OF THE INVENTION

The present invention relates to a hands-free headgear visor assembly that can contain binoculars and other convenient equipment to allow viewing and enjoying sporting and other events without the bother of having to hold the binoculars in the user's hands.

It is thus an object of the present invention to provide a visor or other assembly that can include an adjustable head securing strap to hold the assembly mounted on a person's head and a user focusable binocular that can optionally pivot between an in-use position and a not in-use position. Pivoting can be optionally incorporated into the present invention; the preferred method however is to have no pivoting. The assembly can optionally contain an AM/FM radio, and/or radio scanner, and earphone or two earphones for the radio or scanner, camera, and optional earmuffs for cold weather. If earmuffs are used, the earphone can be removably mounted in the earmuff. It is within the scope of the present invention to provide a single earphone or two earphones. The earphones can be separable and removable from the headgear assembly. It should be noted, that all the components of the invention can be removable allowing the user to build up exactly the correct arrangement for any given event.

DESCRIPTION OF THE DRAWINGS

For further understanding of the present invention, reference should be made to the following described drawings.

Figure 1:
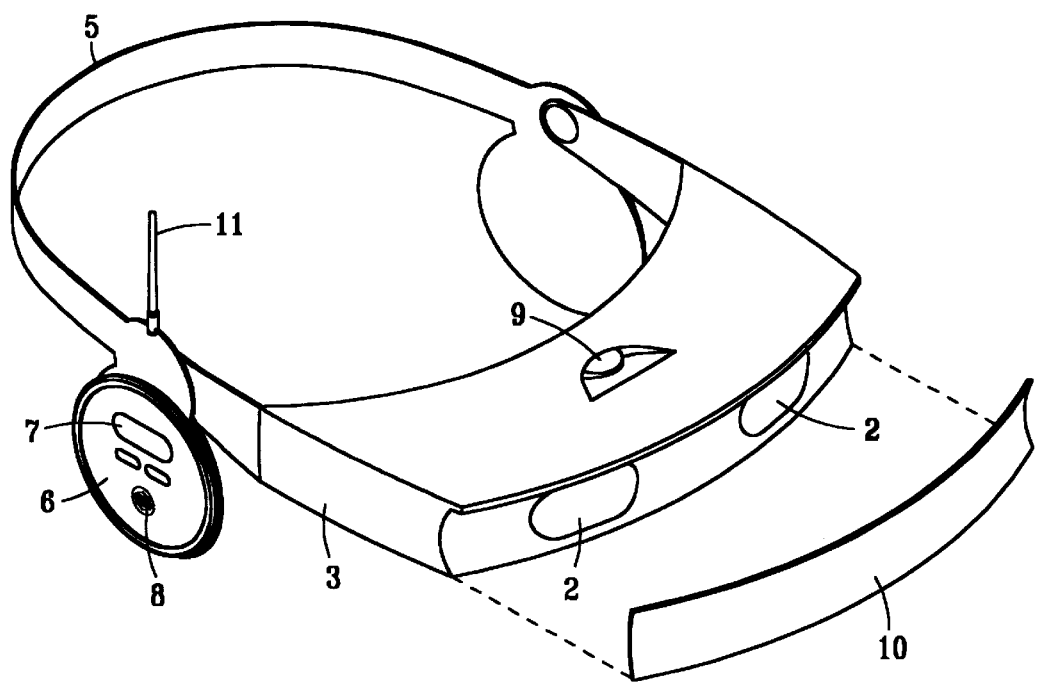
FIG. 1 is a perspective view of an embodiment of the invention.

It should be understood that the above described figures are for the purpose of illustrating the present invention. One skilled in the art will recognize that many other embodiments and configurations are within the scope of the invention besides those shown in the drawings.

DETAILED DESCRIPTION

FIG. 1 shows a perspective view of an embodiment of the present invention. A visor bill 1 can hold binocular lenses 2 with an optional lens cover 10 that protects the lenses when the device is not in use. The side of the visor 3 can be flat or other shape being large enough to contain the lenses 2 and focusing mechanism. An optional focusing knob 9 can be mounted on top of the visor 1 or anywhere else convenient. This knob 9 is used to control focus at different distances. It is within the scope of the present invention to also used fixed focusing at distance as is known in the art without a focus knob or mechanism.

A strap 5 fits around the user's head and can be adjusted to fit different individuals. An optional hinge 4 allows the visor 1 to pivot. This hinge 4 is optional. The preferred mode is with no hinge and no pivoting capability. The invention can also contain an optional removable or fixed radio 6 mounted somewhere on the device. This radio means can be any type of radio apparatus including, but not limited to, AM, FM, combination AM/FM, radio scanner, cellular telephone, ham radio, CB radio, or any other radio receiver or transceiver.

The AM/FM/Scanner radio 6, if used can contain a tuning knob for tuning stations as well as a station indicator 7 and possibly a volume control knob 8. This radio unit 6 can be secured to the head securing strap 5 by any convenient securing means. The radio can be fixed or removable. Optional removable ear muffs can be placed over the radio or in place of it. As has been stated, the radio 6 can be AM or FM or a scanner, or any combination of two of these or all three in a single package.

It should be noted that it is not necessary to have earmuffs for sporting events taking place in the summertime or in any type of warm weather. Therefore, it should be understood that the optional earmuffs even if supplied with the invention, can be removed by the user whenever desired. Also it should be noted, that the user may not always want to use the radio equipment. Therefore, that too can be removable. However, the radio can also be fixed on some embodiments of the invention. In fact, the present invention, in general, represents a combination device where the user can pick and choose the optional equipment to be taken to a particular sporting event. In particular, the earmuffs, radio, earphone, and an optional chin strap (not shown in figures) are removable and can be installed or left off as the user wishes. Thus, the present invention is a method of building up a sports viewing apparatus to fit a custom use.

It should also be noted that the binocular elements 2 shown in FIG. 1 are but one embodiment of binocular elements. It is within the scope of the present invention to combine the two elements into a single assembly, or to use a single optical or telescopic element if desired. It should also be noted that the radio could be AM or FM or a combination of AM and FM which is useful for monitoring the sporting event while it progresses, or tuning to relaxing music during the event; the radio can also be any other type of radio receiver monitoring any channel or frequency band.

It should also be clear that the earphone can be used with or without the optional earmuffs. When the earmuffs are used for cold weather, the earphone or earphones for two ears can be mounted in the earmuffs so that the user can listen to the radio equipment while simultaneously keeping the ears warm. When the invention is used in warm weather, the earphone or earphones can be removed from the earmuffs and used without them.

Figure 3:
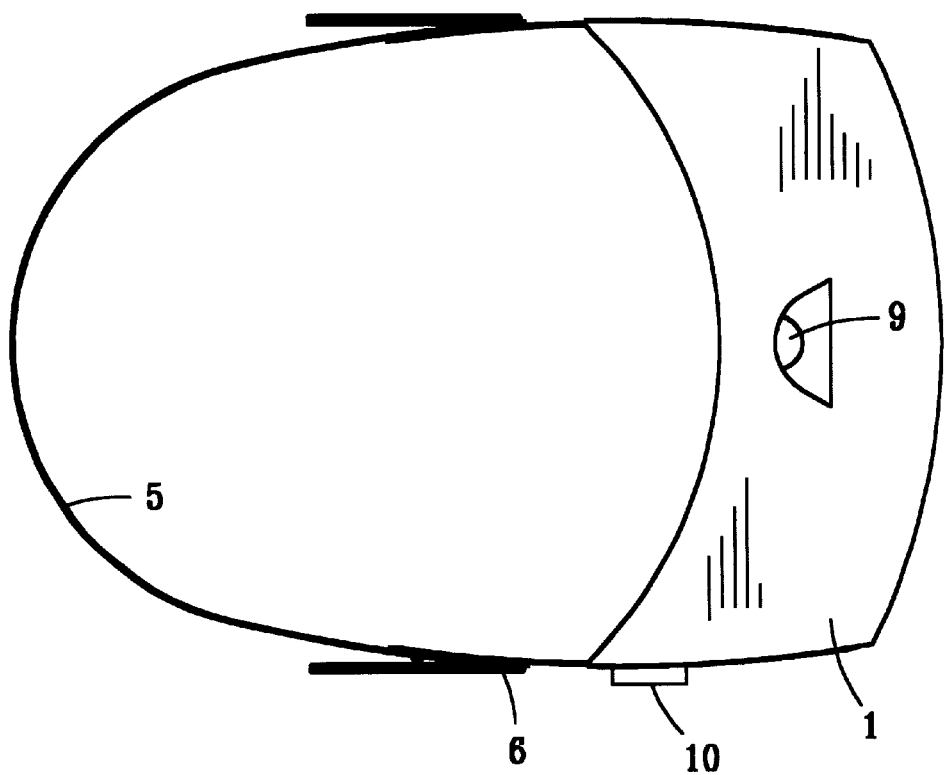
FIG. 3 is a top view of the embodiment of FIG. 1.
Figure 2:
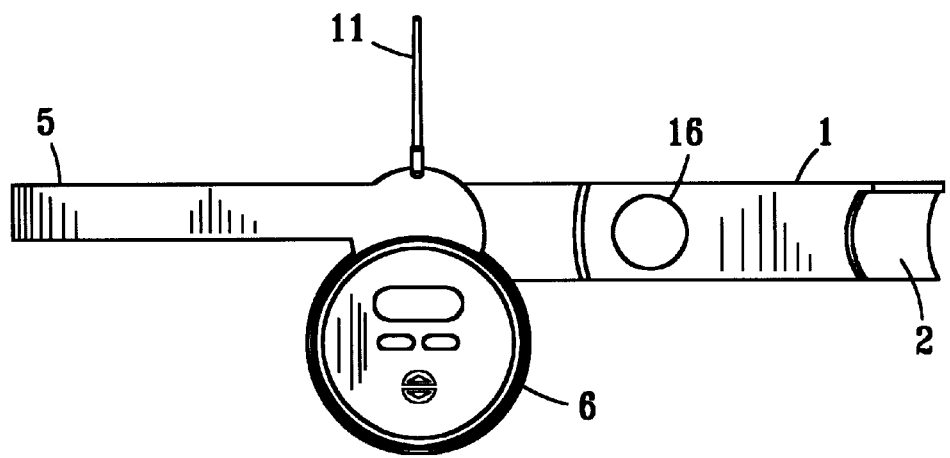
FIG. 2 is a side view of the embodiment of FIG. 1.

FIGS. 2–3 show a top view and side view of the embodiment of FIG. 1. The adjustable headstrap 5, focusing knob 9 and optional radio 6 are clearly seen. In addition, the radio can have a small vertical antenna 11. It should be remembered that the radio means can be any type of radio gear including a cellular telephone. A short vertical antenna 11 as shown in FIG. 2 is most useful for this type of cellular telephone (which is a radio). A standard AM or FM radio (or AM/FM combined) can have an internal coiled antenna for more efficiency.

The present invention can also contain a removable camera. This camera can be mechanical, electronic, digital, or any other type of camera known in the art. The preferred location for this optional camera is in the visor between or behind the binocular or optical elements; however it is within the scope of the invention to place the camera anywhere. A button 16 can be placed anywhere on the apparatus to activate the camera and take a photo. It is within the scope of the invention to use automatic film winding or manual winding with another knob located on the visor (not shown) to wind film. It is also within the scope of the invention to use an electronic camera with a remote button (a button not mounted on the apparatus) that causes it to take a photo.

Figure 4:
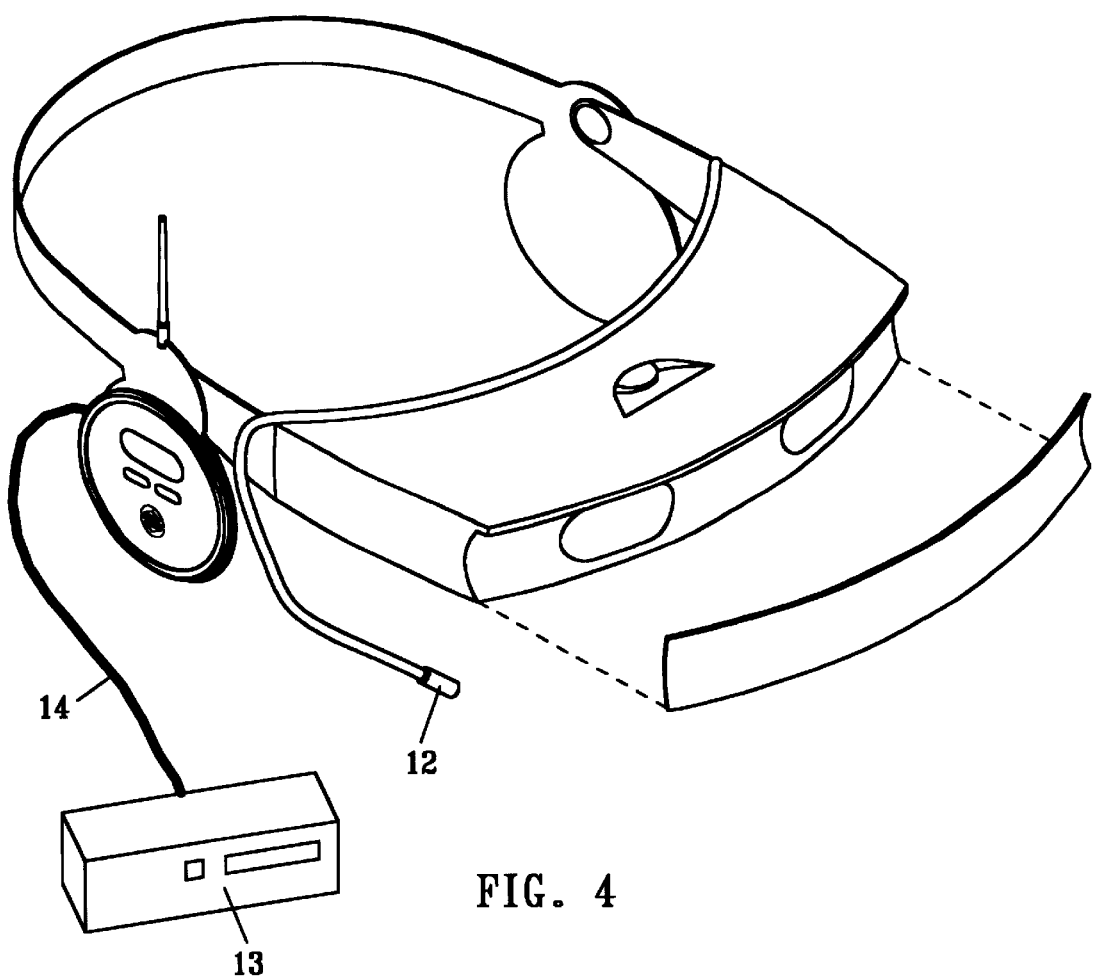
FIG. 4 is a perspective view of an embodiment of the invention containing a microphone.

FIG. 4 shows an embodiment of the present invention with a removable microphone 12. This is particularly useful when the radio is a cellular telephone. In addition, an optional cable 14 can be used with an external scanner radio device 13. This is useful for the invention because some scanners are currently too large for convenient mounting on the headgear. Still, the user may want to wear the headgear while watching an event and simultaneously listen to a scanner. In this case, the external scanner can be placed near the user, but not on the visor itself. It is contemplated that scanner technology may become much smaller in the future, and a complete scanner could be mounted on the headgear.

Figure 5:
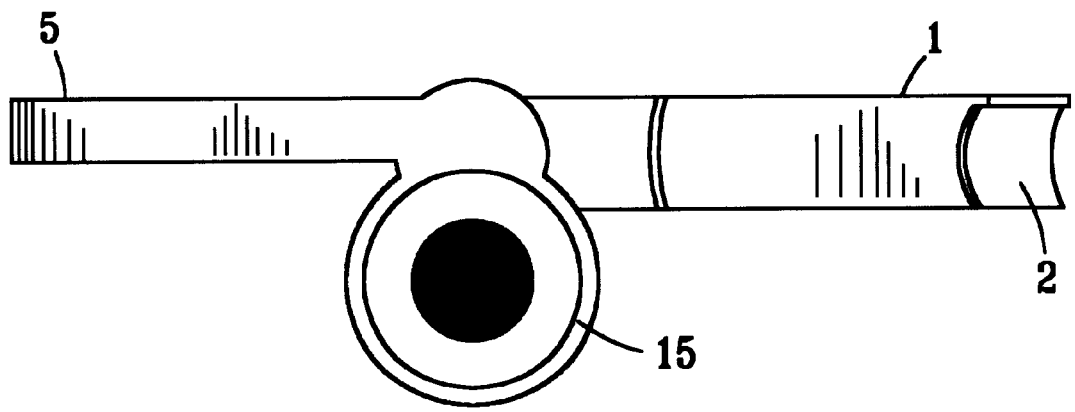
FIG. 5 is a side view of an embodiment of the invention containing earmuffs.

FIG. 5 shows an embodiment of the present invention with removable earmuffs 15. These earmuffs can be constructed to contain the radio within, or to replace the radio at the user's choosing. As previously stated, a major feature of the present invention is the ability of the user to pick and choose what equipment is taken to a given event. In addition, a coiled up external single or double earphone can also be used with the invention. A jack can be provided on the radio for this external earphone. Also, one or two earphones can be mounted inside the earmuffs for winter comfort with the ability to still use the radio.

It should be understood that the examples and illustrations provided herein are to explain and illustrate the invention. It will be appreciated by one skilled in the art that many other changes and variations are within the scope of the present invention. It should be remembered that the scope of the invention is determined from the claims that follow and is in no way limited to the examples or illustrations given in the specification.

I claim:

1. A sports viewing assembly comprising, in combination:
    a head support for holding the assembly on a person's head;
    a binocular assembly attached to said head support, said binocular assembly allowing viewing an event from a distance;
    a radio removably attached to said head support assembly, said radio being removed when desired.

2. The sports viewing assembly of claim 1 further comprising earmuffs removably attached to said head support assembly.

3. The sports viewing assembly of claim 2 wherein said earmuffs fit over said radio.

4. The sports viewing assembly of claim 2 wherein said earmuffs contain at least one earphone.

5. The sports viewing assembly of claim 1 further comprising a microphone removably attached to said head support assembly.

6. The sports viewing assembly of claim 1 wherein said radio is AM or FM or both.

7. The sports viewing assembly of claim 1 wherein said radio is a cellular telephone.

8. The sports viewing assembly of claim 1 wherein said radio is a scanner.

9. The sports viewing assembly of claim 1 further comprising a camera attached to said head support assembly.

10. A selectable sports viewing visor apparatus comprising, in combination:
    an adjustable head support containing a visor;
    at least one telescopic device coupled to said head support, said telescopic device contained in said visor;
    a radio removably attached to said head support;
    earmuffs removably attached to said head support;
    earphones removably attached to said head support, said earphones coupled to said radio.

11. The selectable sports viewing visor apparatus of claim 10 further comprising a microphone removably attached to said head support.

12. A method of configuring a selectable sports viewing device comprising the steps of:
    taking a sports viewing device containing a head support with a visor containing binocular lenses;
    making a decision whether to attach a removable radio to said head support and attaching said radio to said head support if the decision is positive;
    attending an event using said selectable sports viewing device to view said event.

13. The method of claim 12 further comprising making a decision whether to attach removable earmuffs to said head support and attaching said earmuffs if the decision is positive.

14. The method of claim 12 further comprising making a decision whether to attach a removable microphone to said head support and attaching said microphone if the decision is positive.

15. The method of claim 12 further comprising making a decision whether to attach removable earphones to said head support and attaching said earphones if the decision is positive.

16. The method of claim 12 further comprising making a decision whether to use an external radio scanner with said sports viewing device and attaching a cable for said scanner to said head support device if the decision is positive.

17. A sports viewing apparatus comprising a visor means with binoculars for viewing a sporting event, said viewing apparatus containing adjustable head support means for holding said visor means on a user's head, said viewing apparatus containing a radio means attached to said head support means, said viewing apparatus containing at least one earphone means removably attached to said head support means, said removably attached earphone means being removed from said viewing apparatus when not needed.

18. The sports viewing apparatus of claim 17 further comprising earmuff means removably attached to said head support means, said earmuff means being removed when not needed.

19. The sports viewing apparatus of claim 17 further comprising microphone means removably attached to said head support means and coupled into said radio means, said microphone means being removed when not needed.

20. The sports viewing apparatus of claim 17 wherein said radio means is AM or FM or both.

21. The sports viewing apparatus of claim 17 wherein said radio means is a cellular telephone.

22. The sports viewing apparatus of claim 17 further comprising a camera means attached to head support means.

* * * * *